R. L. McCLUNG.
COTTON-SCRAPER, CHOPPER, AND CULTIVATOR.

No. 169,462.  Patented Nov. 2, 1875.

WITNESSES:

INVENTOR:
R. L. McClung
BY Munn & Co
ATTORNEYS.

UNITED STATES PATENT OFFICE.

RICHARD L. McCLUNG, OF LA FAYETTE, TEXAS.

IMPROVEMENT IN COTTON SCRAPERS, CHOPPERS, AND CULTIVATORS.

Specification forming part of Letters Patent No. 169,462, dated November 2, 1875; application filed April 3, 1875.

*To all whom it may concern:*

Figure 1:
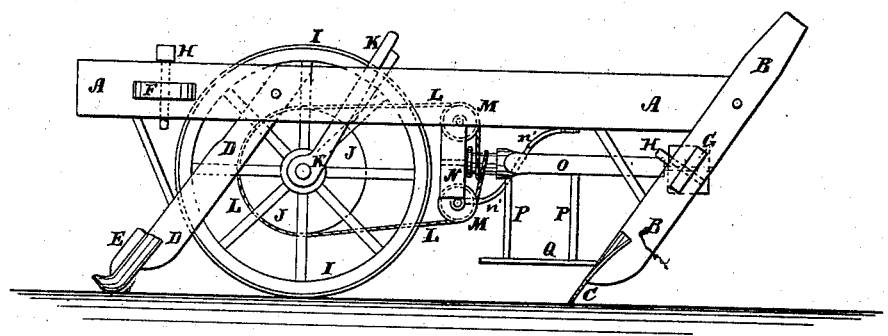
Figure 2:
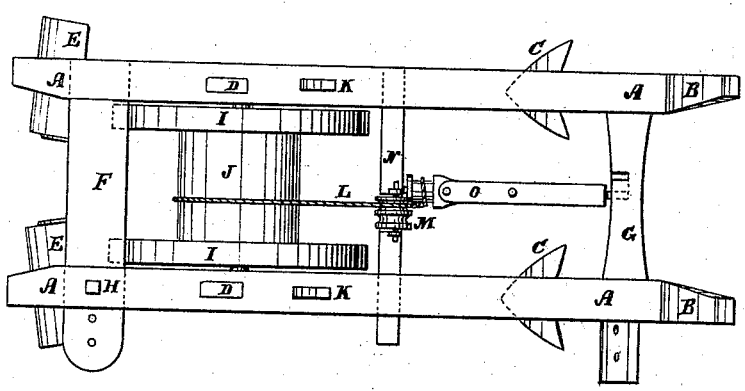

Be it known that I, RICHARD L. MCCLUNG, of La Fayette, in the county of Upshur and State of Texas, have invented a new and useful Improvement in Combined Cotton Scraper, Chopper, and Cultivator, of which the following is a specification:

Figure 1 is a side view of my improved machine. Fig. 2 is a top view of the same.

Similar letters of reference indicate corresponding parts.

The object of this invention is to furnish an improved machine for scraping or barring off cotton, chopping it to a stand, and cultivating it, which shall be so constructed that it may work at any desired closeness to the row of plants, or at any desired depth in the ground, or for use as an ordinary cultivator, and which may be made by any ordinary mechanic.

The invention will first be fully described, and then pointed out in the claim.

A are the plow-beams, to the rear ends of which are attached the standards B, having plows C attached to their lower ends. To the beams A, near their forward ends, are attached the standards D, to the lower ends of which are bolted the scrapers E, said scrapers having several holes formed through them to receive the said bolts so that they can be readily adjusted nearer together or farther apart, or to work deeper or shallower in the ground, as may be desired. The forward ends of the plow beams A are connected by a cross-bar, F, and the rear standards B, just below the rear ends of the beams A, are connected by a cross-bar, G. The cross-bars F and G have long tenons formed upon one end, so that the side parts of the machine can be readily adjusted wider apart or closer together, as may be desired. The tenons of the cross-bars F G have several holes formed through them to receive the detachable pins H, by which they are secured when adjusted. I are two wheels rigidly attached to a shaft, J, the journals of which revolve in the eyes of eyebolts K. The eyebolts K are secured in place by wedge-keys or other suitable means. It is designed to secure the eyebolts in place by nuts screwed upon their upper ends, and by washers placed upon their lower parts, between their eyes and the beams A, so that by varying the number of washers, and adjusting the nuts accordingly, the machine may be adjusted to work deeper or shallower in the ground, as may be desired. L is a band, which passes around the shaft J and around guide-pulleys or rollers M pivoted to the cross-bar N, and around the forward end of the shaft O. The cross-bar N is secured to the beams A, and is strengthened by braces $n'$. The forward journal of the shaft O revolves in a hole in the cross-bar N, and its rear journal revolves in an angular groove in the cross-bar G. To the shaft O are attached two arms, P, to the outer ends of which is attached the hoe or cutter Q. The outer ends of the arms P may be straight, and have the chopper Q attached to them, or they may be bent at an angle and have the chopper bolted to them. The stand may be regulated by varying the size of the wheel-shaft J, or that of the forward end of the chopper-shaft O. By removing the chopping device, replacing the scrapers E with cultivating-plows, and adjusting the forward ends of the beams A closer together than their rear ends, the machine is adjusted for use as an ordinary cultivator. One end of the cross-bar N may be extended and have several holes formed in it to receive the fastening-bolt, so that the machine may also be widened or closed up while being used as a cotton-chopper.

Having thus described my invention, I claim as new and desire to secure by Letters Patent—

The combination of the wheels I, shaft J, band L, guide-pulleys M, cross-bar N, the shaft and arms O P, and hoe or cutter Q, with the frame, and the plow-standards B D, substantially as herein shown and described.

RICHARD L. McCLUNG.

Witnesses:
J. G. McGEE,
H. B. McGEE.